United States Patent
Baumann et al.

(10) Patent No.: US 6,779,753 B2
(45) Date of Patent: Aug. 24, 2004

(54) OPTICAL ASSEMBLY WITH A DETECTOR AND A LASER

(75) Inventors: Rainer Baumann, Überlingen (DE);
Michael Gross, Salem (DE); Hagen Kempas, Überlingen (DE)

(73) Assignee: Bodenseewerk Gerätetechnik GmbH, Überlingen/Bodensee ( * ) Notice: Subject to any disclaimer, the term of this patent is extended or adjusted under 35 U.S.C. 154(b) by 0 days.

(21) Appl. No.: 10/278,116

(22) Filed: Oct. 22, 2002

(65) Prior Publication Data

US 2003/0098387 A1 May 29, 2003

(30) Foreign Application Priority Data

Oct. 30, 2001 (DE) .......................................... 101 53 094

(51) Int. Cl.[7] .............................. F41G 7/26; F41G 7/00
(52) U.S. Cl. ..................... 244/3.16; 244/3.1; 244/3.15
(58) Field of Search .............................. 244/3.1, 3.13, 244/3.15–3.18; 356/27, 28, 28.5, 156.1, 4.01, 4.02–5.15; 702/150–153; 372/9, 10, 14, 15, 16, 17, 24, 33; 382/103, 106, 107; 250/206, 206.1, 206.2, 206.3, 208.1–208.6, 215; 359/196–226

(56) References Cited

U.S. PATENT DOCUMENTS

| | | | | |
|---|---|---|---|---|
| 3,899,145 A | * | 8/1975 | Stephenson ................. | 244/3.13 |
| 4,024,392 A | * | 5/1977 | Teppo et al. ................. | 244/3.16 |
| 4,386,848 A | * | 6/1983 | Clendenin et al. .......... | 356/5.01 |
| 4,576,346 A | * | 3/1986 | Gauggel et al. ............ | 244/3.16 |
| 5,088,659 A | * | 2/1992 | Neff et al. ................... | 244/3.16 |
| 5,224,109 A | * | 6/1993 | Krasutsky et al. ............. | 372/33 |
| 5,285,461 A | * | 2/1994 | Krasutsky et al. ............. | 372/33 |
| 5,779,187 A | * | 7/1998 | Dulat et al. ................. | 244/3.16 |
| 6,145,784 A | * | 11/2000 | Livingston ................. | 244/3.16 |
| 6,179,246 B1 | * | 1/2001 | Fisel et al. ................. | 244/3.16 |
| 6,250,583 B1 | * | 6/2001 | Livingston ................. | 244/3.13 |
| 6,262,800 B1 | * | 7/2001 | Minor ........................ | 244/3.16 |
| 6,343,766 B1 | * | 2/2002 | Livingston ................. | 244/3.13 |
| 6,421,116 B1 | * | 7/2002 | Schilli et al. .................. | 356/28 |
| 6,422,508 B1 | * | 7/2002 | Barnes ....................... | 244/3.16 |

* cited by examiner

*Primary Examiner*—Bernarr E. Gregory
(74) *Attorney, Agent, or Firm*—Scully, Scott, Murphy & Presser

(57) ABSTRACT

A device for detecting attacking guided missiles with optical seeker head and for generating a laser beam directed to such guided missile has an all-around seeker with a detector responding to thermal radiation from the guided missile, and a laser which points to the guided missile detected by the all-around seeker. A roll and pitch gimbal system is provided. A roll gimbal is rotatable relative to the structure about a roll axis. A pitch gimbal is rotatable relative to the roll gimbal about a pitch axis orthogonal to the roll axis. The detector is structure-fixed. An imaging optical system is mounted on the roll and pitch gimbal system. The optical system with its optical axis can point to an object scenario. With each position of the gimbal system, an image of this object scenario is generated on the detector. The laser is also structure-fixed. A laser reflecting surface system is provided on the gimbal system, by means of which the laser beam is kept parallel to the optical axis of the imaging optical system, with each position of the gimbal system. Both the path of rays of the imaging optical system and the laser beam comprise a respective section extending along the pitch axis and a section extending along the roll axis.

18 Claims, 2 Drawing Sheets

OPTICAL ASSEMBLY WITH A DETECTOR AND A LASER

TECHNICAL FIELD

The invention relates to an optical assembly with a detector and an imaging optical system, and with a laser, the emitting a beam parallel to the object-side optical axis of the optical system.

In particular the invention relates to an all-around seeker scanning a substantially hemispherical solid angle and to a laser, which emits a laser beam parallel to the respective instantaneous optical axis of the scanning optical system.

An important application of the invention is a device for detecting guided missiles with optical seeker head and for generating a laser beam directed to the seeker head of such guided missiles. The device comprises an all-around seeker having a detector, which responds to the thermal rdiation from the guided missile, and having a laser the beam of which can be directed to a guided missile detected by the detector.

BACKGROUND OF THE INVENTION

Guided missiles have a seeker head with a detector, which usually responds to infrared radiation. The seeker detects a target to be attacked, such as a fighter aircraft, and provides guidance signals, which guide the missile to the target. In order to protect the target from such guided missiles, equipment is provided on the target for detecting attacking guided missiles. To this end, "all-around seekers" have been used. Such an all-around seeker contains a detector which, in turn, responds to thermal radiation emitted by the guided missile. An imaging optical system, which generates an image of an object scenario on the detector, continuously scans a large, for example hemispheric, solid angle If an attacking guided missile is detected, "counter measures" have to be taken. On such counter measure consists in directing, upon detection of a guided missile, a high intensity laser beam onto the seeker head of this guided missile. Thereby, the detector of the seeker head is "dazzled" and, if possible, destroyed. Then the seeker head no longer "sees" the target. Then the fighter aircraft can avoid a hit by evasive manoeuvres.

Similarly, an assembly of the type described above with all-around seeker and laser may be provided also on a missile, in order to make sensors of the attacked aircraft, by means of which the aircraft detects the attacking missile, inoperative and, thereby, to make evasive manoeuvres more difficult.

DISCLOSURE OF THE INVENTION

It is an object of the invention, to provide an optical assembly with a detector and a laser, wherein the laser beam is always directed to the object scenario detected by the detector.

It is a more specific object of the invention to provide a compact and reliable design of such an optical assembly.

A still further object of the invention is, to provide an optical assembly of the type mentioned above which permits scanning of large solid angles by the detector and also directing a laser beam to any location within this large solid angle.

To this end, the optical assembly comprises a structure-fixed detector defining a detector plane. A roll-pitch gimbal system is provided having a roll gimbal rotatable about a roll axis relative to said structure, and a pitch gimbal rotatable relative to said roll gimbal about a pitch axis orthogonal to said roll axis. An imaging optical system is mounted on said roll-pitch gimbal system and defines a detector path of rays and an object-side optical axis and comprises optical means for directing radiation incident along said optical axis onto said structure-fixed detector in each position of said roll-pitch gimbal system. The optical assembly further comprises laser means for generating a laser beam in a laser path of rays, said laser means comprising a structure-fixed laser. Furthermore, there are laser reflecting means mounted on said roll-pitch gimbal system for directing said laser beam in a direction parallel to said optical axis in each position of said roll-pitch gimbal system.

Thus there is a roll and pitch gimal system. Such a gimbal system permits large angles between the object-side optical axis of the imaging optical system and the roll axis. Therefore, a large solid angle of, for example $2\pi$, i.e. 180° in each radial plane, can be covered by the all-around seeker. Both the dtector and the laser are structure-fixed. This facilitates the power supply and the picking off of signals. Both the radiation emitted by the detected object and directed onto the detector, and the the laser beam are routed over optical elements on the roll and pitch gimbal system, whereby parallel alignment of object-side optical axis and laser beam can be ensured. Thereby, the laser beam is automatically directed to, for example, a guided missile detected by the imaging optical system an the detector.

An embodiment of the invention will be described in greater detail with reference to the accompanying drawings.

PREFERRED EMBODIMENT OF THE INVENTION

Figure 1:
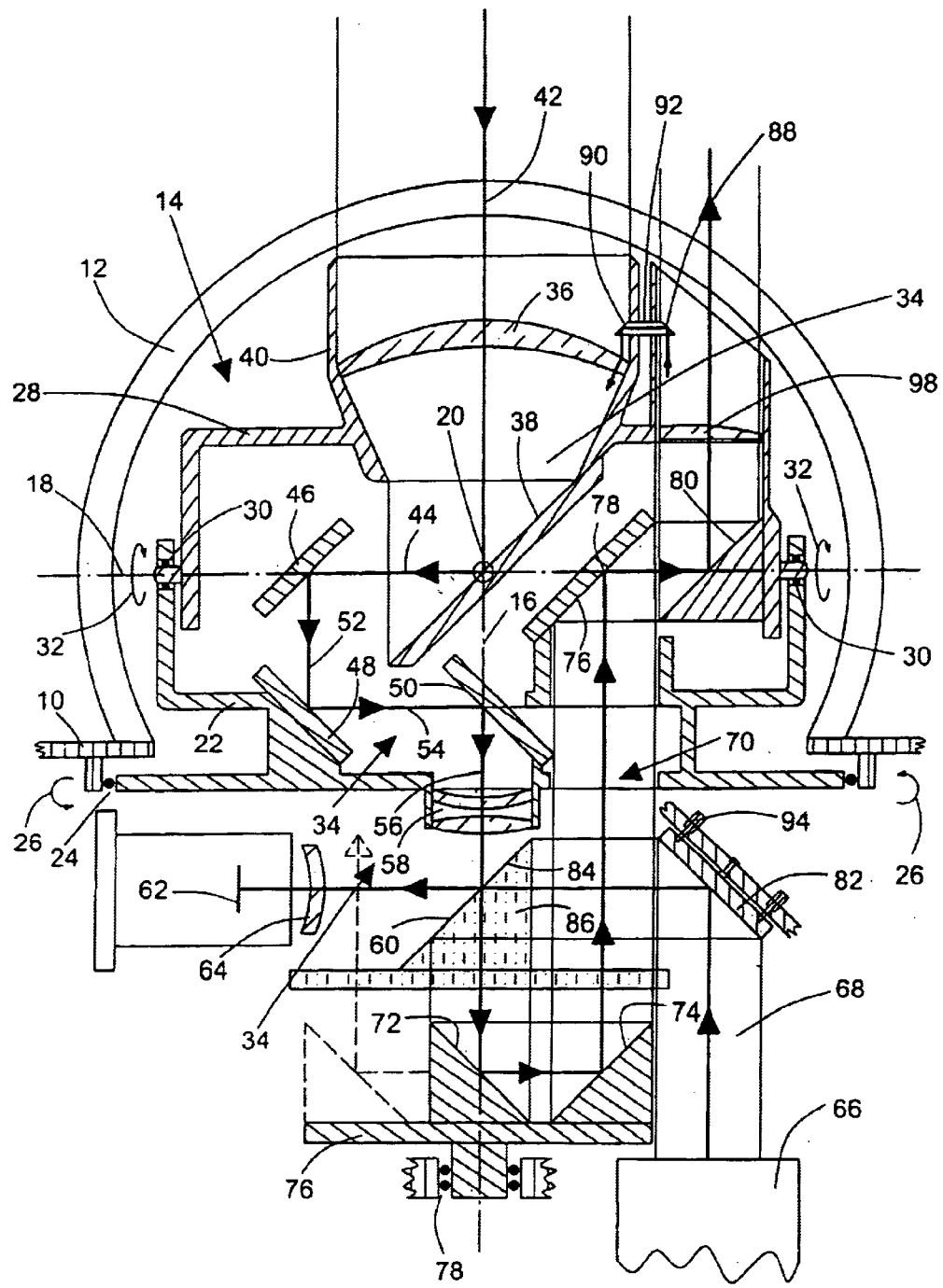
FIG. 1 is a longitudinal sectional view of an optical assembly with an all-around seeker and a laser behind a hemispherical dome.

Referring to the Figure, numeral 10 designates a structure, such as the airframe of a fighter aircraft. A substantially spherical window or "dome" 12 is provided in the airframe. A roll and pitch gimbal system, which is generally designated by 14, is contained within this dome 12. The roll and pitch gimbal system defines a structure-fixed roll axis 16 and a pitch axis 18 orthogonal to the roll axis 16. The dome 12 is curved around the intersection 20 of roll and pitch axes 16 and 18, respectively.

The roll and pitch gimbal system 14 comprises a roll gimbal 22. The roll gimbal 22 is rotatably mounted in the structure 10 for rotation about the roll axis 16 in schematically illustrated bearings 24. This is illustrated, in the Figure, by arrows 26. A pitch gimbal 28 is rotatably mounted for rotation about the pitch axis 18 in bearings 30. This is illustrated in the Figure by arrows 32.

A pitch gimbal system portion 34A of an imaging optical system 34 is mounted on the pitch gimbal 28. The system portion 34A comprises a primary objective 36, which is shown as a lens, here, for simplicity, and a first reflecting surface 38. The primary objective 36 is mounted on the pitch gimbal 28 in a lens mount 40. The primary objective defines an object-side optical axis 42. The optical axis passes through the intersection 20 of roll and pitch axes 16 and 18, respectively, and is orthogonal to the pitch axis 18. The plane of the first reflecting surface extends perpendicular to the plane containing the pitch axis and the optical axis 42, and forms an angle of 45° with each the object-side optical axis 42 and the pitch axis 18. Thereby, the path of rays of the primary objective 36 is deflected by 90°. The optical axis section 44 deflected by the reflecting surface 38 coincides with the pitch axis 18.

A roll gimbal system portion 34B of the imaging optical system 34 contains three reflecting surfaces, namely a second reflecting surface 46, a third reflecting surface 48 an a fourth reflecting surface 50. The plane of the second reflecting surface 46 is perpendicular to the plane containing the roll and pitch axes 16 and 18, respectively, and forms an angle of 45° with the once deflected optical axis section 44 hitting the reflecting surface 46. Thereby, the path of rays of the imaging optical system is deflected by further 90°. Then, the twice deflected optical axis section 52 extends parallel to the roll axis 16. The plane of the third reflecting surface 48 is again perpendicular to the plane containing roll and pitch axes 16 and 18, respectively, and forms an angle of 45° with the twice deflected optical axis section 52. Thereby, the path of rays of the imaging optical system 34 is once more deflected by 90° inwards towards the roll axis 16. The tree times deflected optical axis section 54 extends parallel to the pitch axis 18. The plane of the fourth reflecting surface 50 extends parallel to the plane of the third reflecting surface 48. The surfaces 48 and 50 are facing each other. The three times deflected optical axis section 54 hits the reflecting surface 50 on roll axis 16. Thereby, the path of rays is deflected once more by 90° to the bottom of the Figure. The four times deflected optical axis section 56 of the path of rays coincides with the roll axis 16. This is independent of the angular positions of roll and pitch gimbals 16 and 18, respectively. The roll gimbal system portion 34B furthermore contains a lens assembly 58. The optical axis of the lens assembly 58 coincides with the roll axis 16. An intermediate image of an object scenario is generated by the primary objective between the fourth reflecting surface 50 and the lens assembly 58.

Reference numeral 60 designates a structure-fixed fifth reflecting surface. The fifth reflecting surface extends at an angle of 45° to the roll axis 16. The fifth reflecting surface deflects the path of rays from the roll axis 16 by 90° radially outwards to the structure-fixed, infrared-sensitive detector 62. Preferably, the detector 62 is an image resolving detector in the form of a two dimensional array of detector elements. A lens 64 is placed in front of the detector 62. The lens assembly 58 and the lens 64 form a three-lens detector objective, by which the intermediate image is imaged on the detector 62.

The detector is cooled by a Joule-Thomson cooler down to a low temperature. A light stop (cold stop) cooled with the detector shields the detector from thermal radiation impinging on the detector directly from the environment. The entrance pupil of the imaging optical system 34 can be placed near the first lens of the primary objective. By appropriate imaging of this entrance pupil by the subsequent lenses, the image of the entrance pupil can be placed in the plane of the cold stop, the image of the entrance pupil coinciding with the cold stop. Thereby, the efficiency of the cold stop becomes 100 percent.

A laser 66 generates a high intensity laser beam 68. The laser 66 is laterally spaced from the roll axis 16. Preferably, the laser beam 68 extends substantially parallel to the roll axis 16.

The laser beam 68 is guided by a laser reflecting surface system, which is generally designated by reference numeral 70. The laser reflecting surface system 70 comprises a first laser reflecting surface 72 and a second laser reflecting surface 74. The two laser reflecting surfaces 72 and 74 are mounted on a carrier 76. The carrier is mounted for rotation about the roll axis 16 in bearings 78. A follow-up system or a transmission (not shown) serves to rotate the carrier to follow the rotation of the roll gimbal 22 about the roll axis 16. The mounting of the laser reflecting surfaces 72 and 74 on a separate carrier has merely design reasons. The first laser reflecting surface 72 is traversed by the roll axis 16 and extends at an angle of 45° to the roll axis 16. The second laser reflecting surface 74 is spaced from the roll axis 16. The plane of the second laser reflecting surface 74 is perpendicular to the plane of the first laser reflecting surface 72. In this way, a laser beam incident along the roll axis 16 is deflected by the first laser reflecting surface by 90° and falls radially on the second laser reflecting surface 74. The second laser reflecting surface 74 deflects such a laser beam again by 90° towards the top of the Figure, whereby the laser beam extends parallel to the roll axis 16. The laser beam then falls on a third roll gimbal-fixed laser reflecting surface 76. The impinging point 78 of the laser beam on the laser reflecting surface 76 lies on the pitch axis 18. The plane of the third laser reflecting surface 76 is parallel to the plane of the second laser reflecting surface 74. Therefore, the laser beam is deflected by the third laser reflecting surface 76. Then, the laser beam extends along the pitch axis 18. The laser beam falls on a fourth gimbal-fixed laser reflecting surface 80. The plane of the fourth laser reflecting surface 80 extends perpendicular to the plane containing the pitch axis 18 and the object-side optical axis 42 and at 45° to the pitch axis and the laser beam deflected by the laser reflecting surface 76. Thereby, the laser beam is once more deflected by 90° such that it is always emitted parallel to the optical axis 42, eveb if the pitch gimbal 28 is rotated out of the position illustrated in the Figure.

The laser could be arranged on the roll axis 16 and direct its laser beam directly along the roll axis 16 onto the first laser reflecting surface 72. In the preferred embodiment, the laser beam 68 is directed from the laterally located laser 66 onto a fifth laser reflecting surface 82. The fifth laser reflecting surface 82 is structure-fixed. The plane of the fifth laser reflecting surface 82 extends perpendicular to the plane containing the roll axis 16 and the axis of the emitted laser beam 68 and at an angle of 45° to the laser beam 68. Thereby, the laser beam is deflected inwards towards the roll axis 16. A sixth laser reflecting surface 84 is structure-fixed and extends perpendicular to the plane containing the axis of the laser beam 68 and the roll axis 16 and at 45° to the direction of the deflected laser beam. The sixth laser reflecting surface is hit by the laser beam substantially on the roll axis 16, whereby the laser beam is deflected by 90° onto the first laser reflecting surface 72. In the illustrated embodiment, the fifth reflecting surface 60 of the imaging path of rays and the sixth laser reflecting surface 84 lie substantially in one plane. These reflecting surfaces 60 and 84 are provided by a hypotenuse surface of a rectangular isosceles prisma.

The described laser reflecting surface system is arranged to direct the laser beam 68 laterally past the primary objective or lens 38. Beam-reversing means generally designated by 92 extend into part of the laser beam 68 for directing a partial beam of said laser beam 68 anti-parallel onto said primary objective 38. This partial beam generates through the imaging optical system 34, a light spot in the detector plane. Adjusting means in said laser reflecting surface system controlled by deflection of this light spot from a nominal position adjust the laser beam 68 to an orientation parallel to the object-side optical axis 42. In the preferred embodiment, the beam reversing means 92 comprise two mutually perpendicular reflecting surfaces 88 and 90, a first one (88) of which extends into the laser beam 68 and the second one (90) of which extends on the object side into the path of rays of the imaging optical system 34, whereby part of the laser beam 68 reflected by the first reflecting surface 88 is reflected into the path of rays of the imaging optical system 34 anti-parallel to the emitted laser beam 68. The adjusting means comprise a mirror 82 which is angularly adjustable with two degrees of freedom and piezo actuators 94 for adjusting this mirror 82. The laser beam is directed on and reflected by this mirror 82.

The spherical dome 12 would cause aberration for the laser beam 68. For this reason an off-axis correction lens 98 is located in the path of the laser beam 68 between the fourth laser reflecting surface 80 and the dome 12 for correcting for the aberration caused by this dome 12.

Figure 2:
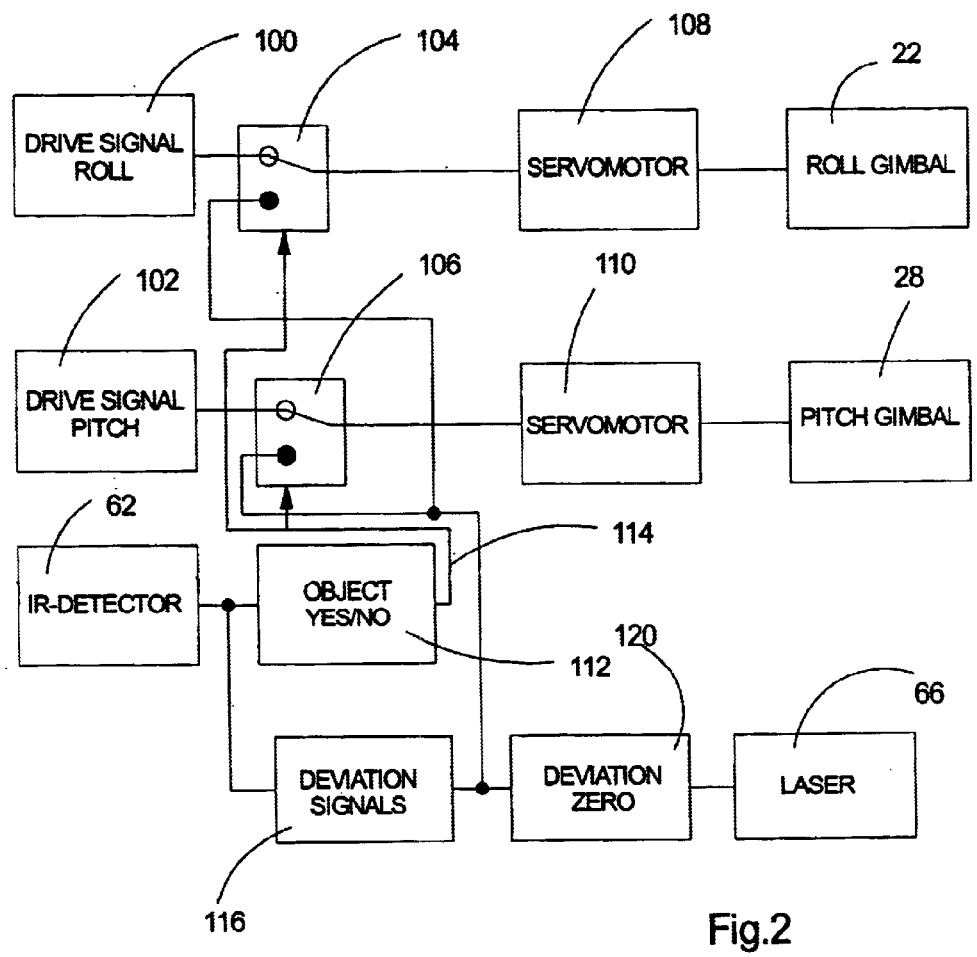
FIG. 2 is a block diagram illustrating the scanning of a solid angle and the triggering of the laser.

FIG. 2 is a block diagram of the scanning of the hemispheric solid angle by an all-around seeker and of the triggering of the laser.

Numerals 100 and 102 designate signal generators for generating drive signals for servo motors 108 and 110, respectively. The drive signals cause, through the servo motors 108 and 110 movements of the roll and pitch gimbals 22 and 28, respectively to scan the hemispheric solid angle in accordance with some appropriate pattern. The drive signals from signal generators 100 and 102 are supplied to the servo motors 108 and 110 through controlled switches 104 and 106, respectively. In FIG. 2, these switches have been shown as electro-mechanical switches for simplicity. The switches have two positions. In the first position shown in FIG. 2, the switches connect the servo motors 108 and 110 to the signal generators 100 and 102, respectively.

The detector 62 indicates, whether an object such as a guided missile is detected or not. This is illustrated by block 112. If an object has been detected, the block 112 changes the positions of the switches 104 and 106. Now deviation signals, indicating the deviation of the detected object from the optical axis 42 are connected to the servo motors 108 and 110. The generation of these deviation signals is represented by block 116. The servo motors 108 and 110 now operate to adjust the roll and pitch gimbals 22 and 28, respectively, such that the deviation becomes zero and the optical axis points to the object. This state is detected by block 120. Block 120 triggers laser 66.

Figure 3:
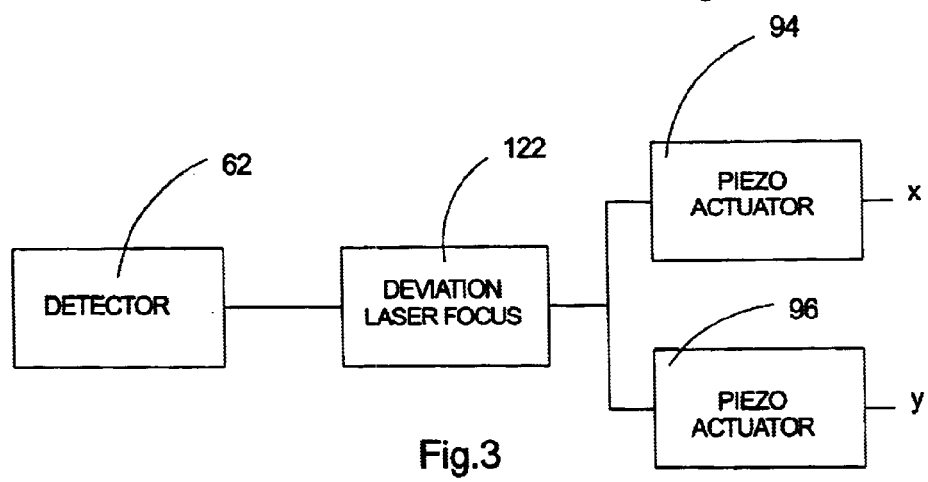
FIG. 3 is a block diagram illustrating the adjustment of the laser beam.

FIG. 3 is a block diagram of the adjustment of the laser beam by mirror 82 and piezo actuators 94 and 96. Block 122 detects the deviation of the light spot or focus generated on the detector 62 by the partial laser beam through the optical system 34 from a nominal position. Block 122 controls the piezo actuators to reduce this deviation to zero.

We claim:

1. An optical assembly in an airborne body structure, comprising:
   a detector fixed to said structure defining a detector plane,
   a roll-pitch gimbal system having a roll gimbal rotatable about a roll axis relative to said structure, and a pitch gimbal rotatable relative to said roll gimbal about a pitch axis orthogonal to said roll axis,
   an imaging optical system mounted on said roll-pitch gimbal system including a detector and defining a detector beam from a detected object to the detector and an optical axis extending from the detected object, and comprising optical means for directing radiation incident along said optical axis onto said detector in each position of said roll-pitch gimbal system,
   laser means for generating a laser beam, said laser means comprising a laser fixed to said structure, and
   laser reflecting means mounted on said roll-pitch gimbal system for directing said laser beam in a direction parallel to said optical axis in each position of said roll-pitch gimbal system.

2. An optical assembly as claimed in claim 1, wherein said imagining optical system comprises imagining optical means mounted on said pitch gimbal in alignment with said optical axis, said pitch gimbal being rotatable about said pitch axis through an angle of substantially 180°, said roll gimbal being rotatable about said roll axis through an angle of 360°, whereby said optical axis can be caused to scan substantially a hemispheric solid angle, said detector being sensitive to thermal radiation from an object within said solid angle.

3. An optical assembly as claimed in claim 1, wherein said detector beam comprises a first section extending along said pitch axis and a second section extending along said roll axis, and said laser beam comprises a first section extending along said pitch axis and a second extending along said roll axis.

4. An optical assembly as claimed in claim 3, wherein
   said imaging optical system comprises pitch gimbal-fixed beam deflecting means for deflecting said radiation incident along said optical axis into a direction parallel to or coincident with said pitch axis, and
   said imaging optical system further comprises roll gimbal-fixed second beam deflecting means for receiving said deflected radiation along said pitch axis and deflecting it into a direction parallel to or coincident with said roll axis.

5. An optical assembly as claimed in claim 4, wherein
   said first beam deflecting means comprise a first reflecting surface passing through an intersection of said roll and pitch axes and forming angles of 45° with said pitch axis and said optical axis,
   said second beam deflecting means comprising:
   a second reflecting surface traversed by said pitch axis, at a right angle to a plane containing said roll and pitch axes and forming an angle of 45° with said pitch axis
   a third reflecting surface which is arranged in said detector beam after deflection thereof by said second reflecting surface and at a right angle to said second reflecting surface, and
   a fourth reflecting surface which is arranged in said detector beam after deflection thereof by said third reflecting surface and parallel to said third reflecting surface, said fourth reflecting surface being traversed by said roll axis.

6. An optical assembly as claimed in claim 5, wherein a fifth reflecting surface, which is fixed to said structure, is arranged at an angle of 45° to said roll axis, said fifth reflecting surface being arranged to deflect said detector beam of said imaging optical system onto said detector, which is arranged lateral of said roll axis.

7. An optical system as claimed in claim 6, wherein said imaging optical system comprises a lens system provided on said roll gimbal between said fourth and fifth reflecting surfaces.

8. An optical system as claimed in claim 7, wherein a further lens of said imaging optical system is provided between said roll fifth reflecting surface and said detector.

9. An optical system as claimed in claim 1, wherein
said imaging optical system comprises a pitch gimbal-fixed primary objective defining said optical axis, and
said laser reflecting means are arranged to direct said laser beam laterally past said primary objective.

10. An optical assembly as claimed in claim 9, and further comprising
beam-reversing means extending into part of said laser beam for direction a partial beam of said laser beam anti-parallel onto said primary objective, said partial beam generating, through said imaging optical system, a light spot in said detector plane, and
adjusting means in said laser reflecting means controlled by deflection of said light spot from a nominal position to adjust said laser beam parallel to said optical axis.

11. An optical assembly as claimed in claim 10, wherein said beam reversing means comprise two mutually perpendicular reflecting surfaces, a first one of which extends into said laser beam and the second one of which extends on a side facing to said object into said detector beam of said imaging optical system, whereby part of said laser beam reflected by said first reflecting surface is reflected into said detector beam of said imaging optical system anti-parallel to said laser beam.

12. An optical assembly as claimed in claim 10, wherein said adjusting means comprise a mirror which is angularly adjustable with two degrees of freedom and piezo actuator means for adjusting said mirror, said laser beam being directed on and reflected by said mirror.

13. An optical assembly as claimed in claim 1, wherein said laser reflecting means comprise:
a carrier rotatable with said roll gimbal,
a first laser reflecting surface traversed by said roll axis and mounted on said carrier at an angle of 45° with respect to said roll axis,
a second laser reflecting surface mounted on said carrier at a right angle to said first laser reflecting surface radially spaced from said roll axis,
said laser beam impinging on said first laser reflecting surface along said roll axis, whereby it is deflected by said first laser reflecting surface by 90°, extends radially to said second laser reflecting surface and is deflected thereby again by 90° to extend parallel to said roll axis at a distance therefrom,
a third laser reflecting surface mounted on said roll gimbal in the path of said laser beam, after said laser beam has been deflected by said second laser reflecting surface being perpendicular to a plane containing said roll and pitch axes and at an angle of 45° to said deflected path of said laser beam and being traversed by said pitch axis, whereby said laser beam is further deflected radially outwards along said pitch axis,
a fourth laser reflecting surface mounted on said pitch gimbal in the path of said further deflected laser beam, said fourth laser reflecting surface being perpendicular to a plane containing said pitch axis and said optical axis and at an angle of 45° relative to said pitch axis, whereby it deflects said laser beam into a direction parallel to said optical axis.

14. An optical assembly as claimed in claim 13, wherein
said structure-fixed laser is arranged at a lateral distance from said roll axis with the axis of said laser beam extending substantially parallel to said roll axis,
said laser reflecting means further comprises a fifth, structure-fixed laser reflecting surface, which extends substantially perpendicular to a plane containing said axis of said laser beam and said roll axis and at 45° relative to said axis of said laser beam, whereby it deflects said laser beam towards said roll axis,
said laser reflecting means still further comprises a sixth structure-fixed laser reflecting surface, which extends substantially perpendicular to a plane containing said axis of said laser beam and said roll axis and at an angle of 45° to said deflected laser beam, said sixth laser reflecting surface being hit by said deflected laser beam substantially on said roll axis, whereby the laser beam is further reflected thereby by 90° towards said first laser reflecting surface.

15. An optical assembly as claimed in claim 14, wherein
said first beam deflecting means comprise a first reflecting surface passing through an intersection of said roll and pitch axes and forming angles of 45° with said pitch axis and said optical axis,
said second beam deflecting means comprising:
a second reflecting surface traversed by said pitch axis, at a right angle to a plane containing said roll and pitch axes and forming an angle of 45° with said pitch axis,
a third reflecting surface which is arranged in said detector beam after deflection thereof by said second reflecting surface and at a right angle to said second reflecting surface, and
a fourth reflecting surface which is arranged in said detector beam after deflection thereof by said third reflecting surface and parallel to said third reflecting surface, said fourth reflecting surface being traversed by said roll axis, and
said fifth reflecting surface of said second beam deflecting means and said sixth laser reflecting surface lie substantially in one common plane.

16. An optical assembly as claimed in claim 13, and further comprising separate follow-up means for rotating said carrier in synchronism with said roll gimbal.

17. An optical assembly as claimed in claim 1, and further comprising a structure-fixed, spherical dome centered to the intersection of said pitch and roll axis.

18. An optical assembly as claimed in claim 17, and further comprising an off-axis correction lens located in the path of said laser beam between said fourth laser reflecting surface and said dome for correcting for the aberration caused by said dome.

* * * * *